| | | | |
|---|---|---|---|
| United States Patent [19] | | [11] | 3,802,624 |
| Kühne et al. | | [45] | Apr. 9, 1974 |

[54] METHOD OF AND AGENTS FOR INFLUENCING WEATHER

[75] Inventors: Rudolf Kühne, Frankfurt, Main; Helmut Diery, Kelkheim, Taunus; Rolf Rehberg, Niederhofheim, Taunus; Heinrich Hamal, Schwalbach, Taunus, all of Germany

[73] Assignee: Farbwerke Hoeschst Aktiengesellschaft vormals Meister Lucius & Bruning, Frankfurt, Germany

[22] Filed: Dec. 18, 1972

[21] Appl. No.: 316,252

[30] Foreign Application Priority Data

Dec. 21, 1971 Switzerland.................. 18829/71
Mar. 27, 1972 Switzerland.................. 4529/72

[52] U.S. Cl.................. 239/2 R, 239/14, 252/325, 47/2
[51] Int. Cl.................. E01h 13/00, B01d 17/00
[58] Field of Search...... 239/2 R, 14; 252/305, 319, 252/325; 47/2

[56] References Cited
UNITED STATES PATENTS

| 3,722,815 | 3/1973 | Moore | 239/2 R |
|---|---|---|---|
| 3,595,477 | 7/1971 | Wollin et al. | 239/14 X |
| 2,934,275 | 4/1960 | Ball | 239/2 R |
| 2,962,450 | 11/1960 | Flod et al. | 239/14 X |
| 3,534,906 | 10/1970 | Gensler | 239/2 R |
| 3,584,412 | 6/1971 | Palmer | 47/2 |
| 3,608,810 | 9/1971 | Kooser | 239/2 R |
| 3,608,820 | 9/1971 | Kooser | 239/2 R |
| 3,647,710 | 3/1972 | Stange | 239/2 R |
| 3,694,372 | 9/1972 | Anderson et al. | 239/2 R |
| 3,715,319 | 2/1973 | Kühne et al. | 239/2 R |

*Primary Examiner*—Robert S. Ward, Jr.
*Attorney, Agent, or Firm*—Curtis, Morris & Safford

[57] ABSTRACT

Polyfunctional alcohols with at least two alcoholic hydroxy groups are effective agents for dispelling fog and clouds. Preferred solid compounds are the so called sugar alcohols, saccharides and polyvinylalcohol, as liquid compounds or compounds with a low melting point alkane-diols, -triols or polyols or their reaction products with oxalkylating agents. The said compounds are sprayed into fog or clouds in finely dispersed form. They may be used, optionally together with other fog and clouds dispelling agents.

11 Claims, No Drawings

METHOD OF AND AGENTS FOR INFLUENCING WEATHER

This invention relates to a method of and agents for influencing the weather.

It is known that foggy weather mainly developing in the colder season is a considerable impediment for the traffic. The autumn and winter months thus become a critical period for the air traffic. But street traffic and naval traffic are impeded too which has consequences for the political economies. Despite many attempts to dispel the fog by physical, chemical and mechanical means, a satisfactory solution to this problem has not yet been found.

It was, now, found that, surprisingly, polyfunctional alcohols have excellent properties enabling them to reduce or to remove the denseness of clouds and, especially, the denseness of fog, above all if the latter is in the form of warm fog which is difficult to influence. For this purpose, these alcohols are generally employed in finely dispersed form having particle sizes of from about 1 to about 100 $\mu$, preferably from about 10 to about 50 $\mu$.

Suitable polyfunctional alcohols are compounds of the formula I $$Z(OH)_n \quad (I)$$

wherein Z is an organic linear, branched or cyclic radical and $n$ is a number of at least 2, provided that two of the OH-groups at least are alcoholic hydroxy groups.

Suitable polyfunctional alcohols are the following:
1. solid, preferably water-soluble compounds of the formula I, wherein Z is a radical as defined above consisting of from 1 to 8 units, especially of 1 or 2 units which contain from 3 to 6, preferably from 4 to 6, most preferably 5 or 6 carbon atoms, and $n$ is a number as defined above, and
2. liquid, semi-liquid compounds or compounds having a low melting point of the formula I wherein Z is a radical as defined above, consisting of from 2 to 70, preferably from 2 to 50, most preferably from 2 to 8 units or only of one unit which contain from 1 to 12, preferably from 2 to 6, most preferably 2 or 3 carbon atoms and $n$ is a number as defined above, preferably, however, 2 or 3, wherein the units mentioned preferably contain carbon, hydrogen and oxygen atoms only and are preferably linked over oxygen atoms.

In a preferred embodiment of the process of the invention, polyvinyl alcohols which are optionally partially acylated and have a molar weight of from about 3,500 to about 2,000,000 are used.

The group of compounds disclosed under 1) comprises, besides the unsubstituted solid diols, triols, tetrols, pentols, hexols and, optionally other polyhydric simple polyols also polyols which contain further substituents, preferably those have in addition to carbon and hydrogen atoms only oxygen atoms, especially carbonyl groups and the functional derivatives thereof, such as acetal, ketal, and semi-acetal groups.

There are also important combinations of functional hydroxy and carbonyl groups, for example, carboxyl groups, acyl or acyloxy groups or lactones, as well as oxygen bridges in the form of ether, acetal and, optionally, lacton groupings as especially present in the linkage of several of the above units.

In the following, there may be mentioned individual representatives of especially interesting classes of compounds of group 1 with particular emphasis on the sugar alcohols and the saccharides, especially the mono-, di- and oligosaccharides.

Suitable weather-influencing substances which can be used in accordance with the invention are, preferably, polyalcohols of the series of the tetritols, pentitols and hexitols, both in the form of the free polyalcohols themselves and in partially etherified form as hydroxymethyl ethers, hydroxyethyl ethers and polyhydroxymethyl ethers, polyhydroyethyl ethers and polyhydroxypropyl ethers, as obtained, for example, by the reaction of polyalochols with formaldehyde, paraformaldehyde, ethylene chlorohydrin, ethylene-oxide, epichlorhydrin, propylene oxide and similar oxalkylating agents.

Suitable weather-influencing substances of the series of tetravalent alcohols are, in particular, the technically easily accessible pentaerythritol, but also the tetritols, erythritol and mesoerythritol. There may be mentioned, among the series of the pentitols, the pentahydric alcohols, the alcohols arabitol, ribitol (also called adonitol) and xylitol obtainable by reduction of the corresponding pentoses, as methyl pentahydric alcohol the rhamnitol and among the series of the hexahydric alcohols or hexitols especially the technically well obtainable compounds sorbitol and mannitol, but also the alcohols iditol, dulcitol and talitol and as cyclic hexahydric alcohol the inositol, furthermore, the intramolecular anhydrous forms obtained by splitting off the water from sorbitol and mannitol, known under the name of sorbitanes and mannitanes, for example, 1,4-anhydrosorbitol, 3,6-anhydro-sorbitol. 1,4;3,6-dianhydrosorbitol, 1,4-anhydro-mannitol, 1,5-anhydro-mannitol, 1,4; 3,6-dianhydro-mannitol and others but also intermolecular anhydrous forms, for example, dipentaerythritol, and others. Suitable are also other diols and triols as for example, 1,1-dimethylol-propane, 2,2-dimethylol propane, 2,2,2-trimethylolethane and cycloalkyl derivatives, for example, 1,3- or 1,4-dihydroxy-cyclohexane, 1,4-dimethylol-cyclohexane or 2,2-bis-(4-hydroxy-cyclohexyl)-propane, and others.

As compounds of the formula I from the series of the sugars, those of the general formula II $$\begin{array}{c} Z_1-(O-Z_2)_n-OH \\ | \quad\quad | \\ R_1 \quad\quad R_2 \end{array} \quad (II)$$

are preferred, wherein $Z_1$ and $Z_2$ are identical or different monosaccharide units having from three to six carbon atoms, $R_1$ and $R_2$ each is a hydrogen atom, a low alkyl, low hydroxyalkyl, acyl or $NH_2$ group, $n$ is zero or a number of 1 to 7, preferably zero or 1.

Furthermore, within the saccharide units an even number of adjacent or sterically favoured OH-groups may be linked to each other like acetals.

From the class of the monosaccharides aldoses and ketoses are equally suitable for the process of the invention, among which the hexoses and pentoses, but also the tetroses, and, optionally, the trioses are preferred. Among the series of the hexoses, there may especially be mentioned the technically well available compounds dextrose (glucose, grape sugar), fructose (laevulose, fruit sugar), sorbose, galactose and mannose, but, on principle, also compounds which are less well available at the time being, such as allose, altrose, gulose, idose and talose. Suitable compounds among the series of the pentoses are arabinose, ribose, xylose and lyxose. Tetroses, for example, erythrose and threose, are also suitable for the process of the invention, and so are disaccharides both of the trehalose type and of the maltose type. Among them, the technically well available compounds of sucrose (cane sugar), lactose (milk sugar) and maltose (malt sugar), are preferred, but the compounds which are less well available at the time being, such as trehalose, isomaltose, cellobiose, melibiose, and others, may be used. From the trisaccharides, raffinose is preferably used, but the less well available trisaccharides gentianose and melicitose as well as the tetrasaccharide stachyose and the pentasaccharide verbascose may also be used. As oligosaccharides having six, seven or eight saccharidal units, there may be mentioned the cyclodextrines (Schardinger dextrines) which are available by the biological decomposition of starch. There are also suitable the mixtures of oligosaccharides, formed by the corresponding hydrolytic decomposition of the starch, for example, mixtures of tri-, tetra-, penta-, hexa- and heptasaccharides, as well as the open-chain-starch decomposition products which are known under the name of dextrines and have in the commerce names like white dextrines and yellow dextrines and English Gum. Compounds acting according to the invention are, furthermore, desoxy sugars, for example, rhamnose and amino sugar, for example, glucosamine and galactose amine, alkylated, for example, methylated sugars, as obtained in the treatment of glucosides with dimethyl sulphate and alkali, furthermore, functionally modified sugars, such as the acetal-like condensation products of sugars with aldehydes or ketones, for example, the aceton or isopropylidene sugars, such as diaceton glucose and diaceton sorbose obtained by condensation with aceton, but also partially acylated sugars, for example, acetylpentoses and acetylhexoses, for example, acetylglucose. There may also be used hydroxy-alkylated products, for example, the reaction products of sugars with formaldehyde, paraformaldehyde, ethylene chlorhydrin, ethylene oxide, epichlorhydrin or propylene oxide or the mixtures thereof.

The compounds in accordance with the invention are preferably used in a form free from waters but in some cases, it may be advantageous to use the compounds in the form of their crystallized hydrates, for example, in the case of the dextrose-monohydrate.

The agents used in accordance with the method of the invention are distinguished by the fact that, besides having a good fog-dispelling efficiency, they are non-toxic and non-detrimental to vegetation. Furthermore, they are non-corrosive toward the metals and metal alloys used in automobile and, especially in aeroplane construction.

The compounds mentioned are preferably used in powder form having a particle size of from about 1 – 100 $\mu$, especially from 5 to 50 $\mu$. Powders having this particle size can be prepared by grinding the compounds in a suitable grinding device, for example, an air-jet-mill. The agents may be used as chemically homogeneous substances, but, preferably, in the form of suitable mixtures of two or more of the mentioned compounds.

Apart from merely economical considerations which play an important part in dispelling fog those mixtures allow, according to the percentage of composition, the nature and properties of the components, to take into account with differentiation the weather parameters prevailing in each case.

The efficiency of sorbitol to dispel fog and clouds may, for example, be increased by adding to it, advantageously before grinding, an amount of about 5 – 20 percent of pentaery-thritol. A similar effect results when combining sorbitol with slight amounts of mannitol.

The efficiency of cane sugar to dispel fog and clouds may, for example, be increased by adding to it in an adequate manner an amount of about 5 – 20 percent of anhydrous fruit sugar. A similar effect is obtained by admixing anhydrous dextrose.

It may, in many cases, be advantageous for the use of the compounds in accordance with the invention, to finish these compounds or their mixtures with suitable finishing agents which may be grinding auxiliaries or anti-clogging agents or both. Those additives which are added in a varying amount of from about 0 to about 50, preferably from 5 to 20 percent by weight, are, above all, finely dispersed inorganic substances, for example, finely dispersed silicium dioxide, finely dispersed aluminium oxide or the hydrated forms thereof, such as clay, Bolus alba, kaoline, Chinaclay and others finely dispersed substances on the basis of silicate, such as asbestine powder, betonites and others, furthermore, magnesium oxide and finely dispersed alkaline earth carbonates and alkaline earth phosphates. Usable organic confectionating agents are, for example, esterified polyvinyl alcohols, polyvinyl acetals and, also, other substances able to function, in known manner, as grinding auxiliary or as anti-clogging agent. When confectionating the fog and cloud dispelling compounds mentioned which may be effected by suitable grinding, in some cases also by spray drying or roller drying, the auxiliaries mentioned may be added before or during the confectionating procedure. Anti-clogging agents may also be added afterwards, for example in a drum-mixer.

An excellent agent efficient against fog and clouds is obtained when grinding a mixture of 85 parts of sorbitol and 15 parts of finely dispersed silicium dioxide on a suitable grinding device, for example, an air jet mill, to a particle size of 5 – 20 $\mu$. An agent of similar properties is obtained when using instead of silicium dioxide as described above finely dispersed tricalcium phosphate or when grinding a mixture of 85 parts of cane sugar and 15 parts of finely dispersed silicium dioxide on a suitable grinding device to a particle size of 10 to 20 $\mu$. A weather-influencing agent of similar efficiency is obtained when using instead of silicium dioxide finely dispersed tricalcium phosphate.

The agents to be used in accordance with the invention or their mixtures are also efficient and usable in combination with other, also fog and cloud dispelling compounds. For this purpose, mixtures of the products of the invention may be used with compounds as described in German Offenlegungsschriften Nos. 2,016,705; 2,025,758; 2,043,497 and 2,043,519 or with other compounds which are also known as being efficient against fog and clouds especially urea but also with inorganic fog and cloud dispelling substances, for example, alkali metal chlorides, alkali metal phosphates and others, and also with ionic or non-ionic surfactants.

When using the agents in combination with other weather-influencing substances which have, above all, the effect of dispelling fog, the portion of the compounds of the invention may vary within the range of from about 10 to about 90 percent. A mixture of from about 20 to 80 percent of the components of the invention with one or more mixing components is preferably used. The preferred mixing component in this case is urea.

An excellent fog-dispelling combination is obtained, for example, when grinding a mixture of 50 parts by weight of sorbitol, 30 parts by weight of urea and 20 parts by weight of finely dispersed silicium dioxide by means of an air jet mill to a particle size of 20 to 50 $\mu$.

A similarly efficient combination is obtained by grinding a mixture of 40 parts by weight of anhydrous dextrose, 40 parts by weight of urea and 20 parts by weight of finely dispersed silicium dioxide by means of an air jet mill to a particle size of 20 to 50 $\mu$.

As compounds suiting for the use in accordance with the invention, which belong to the group of liquid, semi-liquid polyalcohols or polyalcohols having a low melting point indicated under 2) there may be mentioned:

ethylene glycol, diethylene glycol, triethylene glycol, tetraethylene glycol, polyethylene glycols, propandiol-(1,2), propandiol-(1,3), dipropylene glycol, tripropylene glycol, polypropylene glycols and, in general, reaction products of diols, triols, tetrols, or, in general, polyols with oxalkylating agents, for example, formaldehyde, paraformaldehyde, ethylene chlorhydrin, ethylene oxide, epichlorhydrin, or propylene oxide, as well as with mixtures of these oxalkylating agents or mixtures of these compounds, in particular with the oxalkylating agents mentioned, furthermore, oxalkylated compounds as obtained by alternating use of the said oxalkylating agents.

Suitable compounds are, furthermore, those obtained by reacting the oxalkylating agents mentioned above, especially ethylene oxide and propylene oxide, or by reacting some of these oxalkylating agents, with sugars or with sugar mixtures or with mixtures of sugar and other polyols, as well as mixtures of the products so obtained and in admixture with other polyols. There may also be used co-oxalkylating products as obtained by the simultaneous action of oxalkylating agents on sugar or sugar mixtures and polyols or polyol mixtures, in which case part of the polyols may be replaced by water. Sugar is herein meant to be natural mono- and oligosaccharides, for example, dextrose, fructose, sorbose, saccharose, maltose, lactose, and others, but also technical grade sugar mixtures, for example, obtained by hydrolasis of starch or cellulose. By sugar, there is also to be understood sugar derivatives, for example, sugar acetals, for example, 60-methyl glucose, or alkylated, for example, methylated or acylated, for example, acetylated or phosphorylated saccharides or the derivatives thereof which have another constitution.

Various oxalkylating products of this nature are disclosed, for example, in German Offenlegungsschrift No. 1,595,066, in U.S. Pat. No. 3,357,970, in German Auslegeschrift No. 1,443,022 and in German Pat. No. 1,468,417.

These oxalkylating products may be used in chemically homogeneous form, preferably, however, in the form of the mixtures obtained in oxalkylating processes.

Suitable oxalkylating products are those having a molecular weight of 130 to 2000, preferably 150 – 1,000, more preferably a medium molecular weight of 180 – 500.

"Low-melting" compounds are those the melting point of which is below about 60°C, preferably of 15° to 35°C, most preferably of 10° to 25°C. Those compounds are, for example, butandiol-(1,4), butandiol-(2,3), 2,3-dimethyl-butandiol-(2,3) or similar compounds or oxalkylating agents of higher molecular weight especially of wax-like structure and unable of being ground because of their brittleness.

Further polyols suitable for use are, for example, glycerol and polyglycerols, butandiol-(1,2), butandiol-(1,3), butandiol-(1,4), butantriol-(1,2,4), pentandiol-(1,5), hexandiol-(1,5), hexandiol-(1,6), hexandiol-(2,5), 2,3-dimethyl-butandiol-(2,3), hexantriol-(1,2,6), 2-methyl-pentandiol-(2,4), 1,1,1-trimethylolpropane, 2,2-dimethyl-hexandiol-(1,3), 2-ethylhexandiol-(1,3), but also polyalcohols of mean solubility in water, for example, nonandiol-(1,9), decandiol-(1,10), and others.

The compounds of the invention are preferably used in anhydrous form. In some cases, for example, with high viscosity, it may be advantageous to use concentrated, aqueous solutions of the agents. The agents may be used in chemically homogeneous form, preferably in the form of suitable mixtures, for example, solutions or dispersions, but also in the form of eutectic mixtures which allow according to the percentage of composition, the nature and properties of the components, to take into account with differentiation the prevailing weather parameters in each case.

The agents of the invention or their mixtures are also efficient and usable in admixture with other compounds having a fog-dispelling effect. So, for example, the solid polyalcohols and sugars, which have been mentioned above, may be used in the form of solutions or dispersions in liquid polyalcohols. The combination may vary within any desired mixing range; its usability only depends on the consistency obtained and on its ability of being sprayed.

A suitable mixture for dispelling fog and clouds is, for example, a solution of 20 parts by weight of sorbitol in 80 parts by weight of ethylene glycol.

A similarly efficient mixture is obtained when using instead of ethylene glycol propandiol-(1,2).

Suitable mixing components are, also, those mentioned in German Offenlegungsschriften Nos. 2,016,705, 2,025,758, 2,043,497 and 2,043,519 as solutions in liquid polyalcohols. Urea and inorganic, fog-dispelling substances, for example, alkali metal chlorides, alkaline earth metal chlorides, alkali metal phosphates, and others are suitable mixing components.

An efficient, weather-influencing agent is obtained, for example, by dissolving 20 parts by weight of urea in 80 parts by weight of propandiol-(1,2).

It may also be advantageous to add to the agent of the invention ionic or non-ionic surfactants.

The dissemination of the novel agents or mixtures of agents in the foggy space in order to remove fog and clouds may vary within relatively wide limits of from about 1 mg/m$^3$ to about 100 mg/m$^3$. It is comprehensive, however, that the effectively required amount has to be found, as the case may be, on the basis of meteorological parameters, for example wind speed. Furthermore, the dissemination of the agents of the invention or their mixtures under determined critical weather conditions allows to avoid or to reduce to a great extent the formation of fog.

The novel, liquid agents or agents having a low melting point or mixtures of these agents are used in disperse form, preferably as small drips having a diameter of 5 – 1,000 $\mu$, especially of 10 – 500 $\mu$. The drops' size and, thus, the descending speed or dwelling period of the agents in the space of treatment may be adapted to an optimal to the prevailing weather parameters, for example, the wind conditions. Small drops are especially suitable for dispelling cumulus clouds when treating them from the upwind zone under these clouds. Cumulus clouds may, for example, be dispelled by spraying, under the basis of these clouds, diethylene glycol by means of a suitable nozzle in such a manner that small drops of a 50 – 100 $\mu$ diameter are formed. Bigger drops are suitable for dispelling stratus clouds and natural fogs of different denseness. To obtain a good degree of efficiency it is advantageous in most of the cases to achieve an optimally adapted drop spectrum within closely confined limits by chosing the adequate spray nozzles and spray conditions (spray pressure, nozzle diameter).

For nozzle-spraying, there are suitably used unary and binary nozzles of conventional structure and spraying devices with rotating parts, for example, rotating disks or cylinders. Eutectic mixtures or high-viscous liquids are advantageously disseminated by means of heatable nozzles; these agents also may first be heated and then disseminated. In some cases it may be advantageous to spray the agents through the nozzle in admixture with a suitable, easily volatile solvent or diluent, for example, aceton, or to use them in the form of an emulsion.

The agents of the invention may be dusted or sprayed, for example, by means of nozzles according to the Venturi principle. Furthermore, pressurized gases such as compressed air, $CO_2$, $N_2$ or fluorinated hydrocarbons may be used as propellants for the agents.

The agents may be distributed by various methods. Fixed or mobile dusting or spraying instruments on the ground and aeroplanes or helicopters carrying the corresponding instruments may be used. One or more aeroplanes or helicopters may dust or spray the agents of the invention or their mixtures over the fog-bank. Likewise, the agents may be introduced or shot into the clouds which may be effected in the cloud itself or directly at the basis of the clouds but also from the zone above the cloud. Cumulus clouds are better treated by introducing the agents into the upwind zone under the cloud. The agents may be introduced into the fog from the ground, for example, with mobile or fixed large ventilators. In this case, a combination with fog-dispelling methods under the action of heat is possible, wherein the blast air required for atomizing the agents is adequately preheated. It may, in many cases, be advantageous to combine the spray aggregates on the ground and those in the aeroplanes, for example, in such a manner that agents locally introduced into the fog by a suitable dusting or spraying aggregate on the ground cause a fog-free zone from which a correspondingly equiped helicopter or a STOL- or V-STOL-aeroplane (i.e.: aeroplanes having a short or extremely short taxi strip or landing path) equipped with spraying aggregates can start. The further dispelling of fog may then be effected from the air space. A further variant of the invention is to use the agents in different mixing ratios or differently conditioned with optimal adjustment to the requirements and the meteorological parameters given when dusting or spraying from the ground or dispelling the fog from the air.

The following examples illustrate the invention, the parts and percentages are by weight unless stated otherwise:

EXAMPLE 1

30 kg of cane sugar, ground to a particle size of 5 to 30 $\mu$ were dusted from a special aeroplane for agricultural use (of the type of Grumman Ag-Cat) provided with a nozzle according to the Venturi principle suitable for dusting solid bodies over a relatively small cumulus cloud in developing state, the aeroplane overflying the cloud at a height (minimal distance) of about 50 m. The height at which the treatment was effected was 1500 m and the temperature in this zone was + 9°C. After a 6 minutes' latent period the cloud showed changes of structure which led to the disintegration into relatively small particles and, finally, after about 15 minutes in total, to the dissolution of the cloud.

EXAMPLE 2

90 Parts of cane sugar and 10 parts of anhydrous dextrose were mixed in a drum mixer and ground in an air jet mill to a particle size of 15 to 30 $\mu$. 30 kg of the weather-influencing agent thus obtained were disseminated from the aeroplane described in Example 1 at a distance of about 50 m over a cloud of the stratocumulus type. The basis of the cloud was at a height of 1,400 m and its cover reached a depth of about 50 m. The temperature in the zone of treatment was + 10°C. After a 5 minutes' latent period the cloud showed signs of dissolution. It was observed from an aeroplane flying in circles over the cloud that the mass of the clouds became flocky at the atomized spot and was dispelled after about 15 minutes in total.

EXAMPLE 3

85 Parts of cane sugar and 15 parts of finely dispersed silicium dioxide were ground in an air jet mill to a particle size of 10 to 20 $\mu$. 30 kg of the weather-influencing agent so obtained were blown from the aeroplane described in Example 1 at a height of about 50 m below the basis of the cumulus cloud into the upwind zone under the cloud. The basis of the cloud was at a height of 1200 m, the temperature in the zone of treatment was + 12°C and the upwind speed component was 3 m/sec. It was observed from the aeroplane how the weather-influencing agent moved upwards into the cloud. About 2 minutes aftr disseminating had been terminated holes were formed in the basis of the cloud and the structure gradually became netlike. Within about 15 minutes the part of the cloud which had been treated was dispelled.

EXAMPLE 4

Eighty-five parts of anhydrous dextrose and 15 parts of finely dispersed tricalcium phosphate were ground in an air jet mill to a particle size of 20 to 40 $\mu$. 30 kg of the weather-influencing agent were dusted from the aeroplane as described in Example 1 at a distance of about 50 m over a stratus cover (high fog) about 100 m thick lying in a height of 800 to 900 m. The agent was disseminated in a circular line. The temperature in the zone of treatment was + 12°C. After a 8 minutes' latent period it could be observed from the ground that the stratus cover distinctly cleared up. After a further 10 minutes a hole of irregular outlines of about 300 m diameter had been formed in the cover of the cloud.

EXAMPLE 5

Over a fog screen lying upon the ground in a valley allowing a visibilty range of about 30 m and having a temperature of + 4°C, the weather-influencing agent described in Example 4 was disseminated from the aeroplane mentioned in Example 1 at a distance of about 50 m over the upper limit of the fog. The amount of agent used was about 10 mg/m$^3$. After a 10 minutes' latent period the visibility range was improved to reach about 180 m.

EXAMPLE 6

Under the same testing conditions as described in Example 5, the weather-influencing agent described in Example 3 was used. An improvement of the visibility range from about 30 m to about 170 m was obtained.

EXAMPLE 7

Eighty parts of cane sugar, 10 parts of anhydrous fruit sugar and 10 parts of finely dispersed tricalcium phosphate were ground on an air jet mill to a particle size of 30 to 50 $\mu$. 20 kg of the weather-influencing agent were dusted from the aeroplane described in Example 1 over a fog screen upon the ground covering a river plain 2 km in length and about 100 m in breadth. After about 5 minutes it could be ovserved from the aeroplane that the fog was dispelled and after a further 5 minutes sight on the ground was possible.

EXAMPLE 8

In a natural fog in which marked sticks were installed along an axis with a sight distance of about 30 m and a temperature of + 9°C. By means of a ground spraying instrument as used for spraying insecticides in agriculture, a weather-influencing agent was introduced into the fog which agent was prepared from 85 parts of anhydrous dextrose and 15 parts of finely dispersed silicium dioxide by grinding an air jet mill. The particle size was 5 to 25 $\mu$. The concentration of the agent in the space of treatment was about 10 mg/m$^3$. About 10 minutes after spraying the visibility range was improved to reach about 180 m.

EXAMPLE 9

Forty parts of urea, 40 parts of anhydrous dextrose and 20 parts of finely dispersed silicium dioxide were ground in an air jet mill to a particle size of 20 to 50 $\mu$. The weather-influencing agent so obtained was introduced into a natural fog from a steel cylinder which contained carbon dioxide as propellant. In the fog marked sticks were installed along an axis. At a temperature of 30 5°C there was a visibility range of about 30 m. The space of treatment was charged with about 10 mg/m$^3$. About 10 minutes after having introduced the agent, the visibility range was improved to reach about 200 m. In a blank test in which the steel cylinder only contained carbon dioxide no improvement of the sight distance was observed.

EXAMPLE 10

Fifty-five parts of white dextrin and 45 parts of finely dispersed silicium dioxide were mixed and ground to a particle size of 10 to 20 $\mu$. 2 kg of the weather-influencing agent so obtained were dusted by means of an air jet mill which was installed in an aeroplane (of the type of Dornier Do 27) and which was provided with nitrogen as propellant from a steel cylinder, over a fog screen upon the ground at a flying speed of 65 km/h and at a distance of about 50 m to the upper limit of the fog. About 5 minutes after having dusted the agent irregularities were observed in the fog screen and after a further 10 minutes there was visibility on the ground in the space treated with the agent.

EXAMPLE 11

Sorbitol was ground in an air jet mill to a particle size of 5 to 20 $\mu$. 30 kg of the weather-influencing agent so obtained were blown from the aeroplane described in Example 1 directly into the basis of a relatively small cumulus cloud. The basis of the cloud was at a height of 1,800 m and the cloud reached a height of about 2100 m. The temperature in the zone to be treated was + 8°C. After about a 3 minutes' latent period changes in structure could be observed in the cloud and in the course of a further 8 minutes the cloud was completely dispelled.

EXAMPLE 12

20 parts of pentaerythritol and 80 parts of sorbitol were mixed in a drum mixer and then ground in an air jet mill to a particle size of 20 to 40 $\mu$.

Thirty kg of the weather-influencing agent so obtained were disseminated by means of the aeroplane as described in Example 1 at a distance of about 50 m over the cloud of the stratocumulus type. The basis of the cloud was at a height of 1600 m. The temperature in the zone of treatment was +7°C. After about a 2 minutes' latent period symptoms of dispelling were observed in the cloud. It could be seen from an aeroplane flying in circles over the cloud that at first large ditches were formed in the mass of cloud and then, in the following 8 minutes, the treated part of the cloud was dispelled starting from these ditches.

EXAMPLE 13

85 Parts of sorbitol were ground in an air jet mill while 15 parts of finely dispersed silicium dioxide were added. The ground material was made up to a particle size of 10 to 20 $\mu$. . 30 kg of the weather-influencing agent so obtained were disseminated from the aeroplane described in Example 1 at about 50 m under the basis of a cumulus cloud into the upwind zone under this cloud. The basis of the cloud was at a height of 1,400 m, the temperature in the zone of treatment was + 11°C, and the upwind component was about 4 m/sec. It could be observed from the ground how the weather-influencing agent was absorbed by the mass of cloud. About 1 minute after atomizing had been terminated small perforations could be observed in the basis of the cloud which rapidly grew larger and led to complete dispelling after about 5 minutes.

EXAMPLE 14

Eighty parts of sorbitol and 20 parts of finely dispersed tricalcium phosphate were ground to a particle size of 25 to 40 $\mu$. 30 kg of the weather-influencing agent so obtained were dusted from the aeroplane described in Example 1 at a height of about 500 m over a stratus cover (high fog) lying at a height of about 800 to 900 m and having a thickness of about 100 m. The agent was introduced by disseminating in a circular line. The temperature in the zone of treatment was + 8°C. After a 4 minutes' latent period it could be observed from the ground that the stratus cover fairly cleared up. After a further 8 minutes a hole of irregular outlines of a diameter of about 300 m had been formed in the cloud which remained open for about 20 minutes and was slowly reclosed by a slight wind current.

EXAMPLE 15

Over a fog screen lying upon the ground in a valley in which there was a visibility range of 30 m and a temperature of + 6°C the weather-influencing agent described in Example 14 was disseminated from the aeroplane described in Example 1 at a distance of about 50 m over the upper fog limit. The amount of agent used was about 10 mg/m$^3$. After a 10 minutes' latent period the visibility range was improved to reach 150 m.

EXAMPLE 16

Over a fog about 40 m thick lying in a river valley 40 kg of the weather-influencing agent described in Example 13 were disseminated from the aeroplane described in Example 1 (from a height of 100 m) over a length of 2 km and a breadth of about 100 m. After about 5 minutes it could be observed from the aeroplane that the fog was dispelled; after a further 4 minutes there was visibility on the ground in the space treated.

EXAMPLE 17

In a natural fog in which marked sticks were installed along an axis there was a sight distance of 30 m and a temperature of + 11°C. By means of a ground spraying device as used in agriculture for spraying insecticides a weather-influencing agent was disseminated which consisted of 70 parts of sorbitol, 10 parts of mannitol and 20 parts of finely dispersed tricalcium phosphate ground on an air jet mill. The particle size was 15 to 30 $\mu$. The amount of agent introduced into the space of treatment was about 10 mg/m$^3$. About 10 minutes after dusting the visibility range improved to reach 120 m.

EXAMPLE 18

50 Parts of sorbitol, 30 parts of urea and 20 parts of finely dispersed silicium dioxide were ground on an air jet mill to a particle size of 10 to 25 $\mu$. The weather-influencing agent so obtained was set in in an amount of about 10 mg/m$^3$. It was introduced by means of a steel cylinder containing carbon dioxide as propellant into a natural fog in which marked sticks were installed along an axis. At a temperature of + 4°C there was a visibility range of 30 m. About 10 minutes after having introduced the agent the visibility range was improved to reach 120 m. In a blank test in which the steel cylinder only contained carbon dioxide no improvement of visibiliy could be stated.

EXAMPLE 19

95 Parts of ground cane sugar having a particle size of 20-100 $\mu$ and 5 parts of finely dispersed silicium dioxide were first mixed in a drum and then homogenized on a helical mixer. 30 kg of the agent so obtained were dusted from an aeroplane as described in Example 1 over a length of 1.5 km over a high fog lying in a valley The aeroplane was about 50 m above the fog zone and disseminating was effected at a length of about 80 m. After about 4 minutes the fog screen disintegrated in the space treated and after a further 8 minutes there was visibility on the ground.

EXAMPLE 20

A mixture of 90 parts of ground cane sugar having a particle size of 30 - 70 $\mu$, 4 parts of finely dispersed silicium dioxide and 6 parts of finely dispersed tricalcium phosphate were homogenized in a helical mixer. Sixty kg of the agent so obtained were introduced into a high fog as described in Example 19, which was lying in a valley. About 5 minutes after disseminating had been terminated a ditch which could well be seen from the air had been formed which enlargened rapidly. After about 15 minutes in total there was visibility over a length of about 1.5 km and a breadth of about 200 m on the ground. The sun falling through this hole caused the fog to dissolve rapidly by heating the ground intensely. About 40 minutes after the test the whole valley was free from fog whereas in a neighboured valley in which the fog conditions were the same the natural fog dissolution occurred only two hours later.

EXAMPLE 21

Sixty parts of sorbitol, 20 parts of dextrose, 10 parts of silicium dioxide and 10 parts of tricalcium phosphate were ground on a mill to a particle size of 40 to 50 $\mu$. 60 kg of the agent mixture so obtained were introduced from the aeroplane described in Example 1 in a fog lying in a valley which fog had been formed by temperature inversion and which extended vertically over about 80 m. The visibility range in this fog which was lying upon the valley bottom was about 30 m and the temperature about + 2°C. From a height of about 50 m over the upper limit of the fog the agent mixture was disseminated in carpet-like manner by overflying the fog four times. About 5 minutes after having terminated the treatment net-like structures could be observed from the aeroplane in the upper limit of the fog which was from there on torn to individual rags thus providing a large visibility on the ground. It was observed at the valley bottom that the fog coagulated and the visibility improved in fluctuating manner. After about 20 minutes in total only several smaller rags of fog were to be seen in the valley, mainly at the edges of the valley which, however, did not impede the visibility any more.

EXAMPLE 22

Into a natural fog 10 m high in which marked sticks were installed along an axis and there was a visual range of 3 m as well as an inner temperature of 7°C polyvinyl acetate in powder form partially saponified to polyvinyl alcohol (degree of saponification: 88 percent, molar weight of the polymer: 90,000) was disseminated at a height of 10 m from a steel cylinder which contained carbon dioxide as propellant, so that the specific amount in the zone of treatment was 8 mg/m³ of the substance. Within 10 minutes thereafter the visibility range was improved to reach 10 to 12 m. In a blank test in which the fog was sprayed only with the finely dispersed carbon dioxide alone, no improvement of visibility whatsoever was obtained.

EXAMPLE 23

A fog having the same physical conditions as that described in Example 22 was treated under the same testing conditions with a polyvinyl alcohol in powder form (degree of saponification of the polyvinyl acetate: 98 percent, molar weight: 90,000). In this case too, the visibility range was improved within 10 minutes to reach 9 to 10 m, a blank test carried out with carbon dioxide alone showing no improvement of the visibility at all.

EXAMPLE 24

From an aeroplane 25 kg of dithylene glycol were nozzle-sprayed immediately in the basis of a smaller cumulus cloud. The basis of this cloud was at a height of 1,600 m and the cloud itself reached a height of about 1,900m. In the zone of treatment, the temperature measured was + 8°C. In the fuselage of the aeroplane (of the type of Dornier Do 27) a pressure vessel for the agent and a compressed air bottle with reduction valve were mounted. This device allowed to atomize the agent through 6 unary nozzles installed under the wing. The diameter of the nozzles and the spraying pressure were chosen such that mainly small drops of a diameter of about 50 to 100 μ were formed. After about a 4 minutes' latent period after spraying had been terminated net-like structures appeared in the cloud basis which rapidly spread over the other parts of the cloud and led to complete dissolution of the cloud in the course of 16 minutes in total. Comparable clouds in the neighbourhood did not show any appreciable changes.

EXAMPLE 25

By means of the spraying aeroplane described in Example 24 a mixture of 10 kg of propandiol-(1,2), 20 kg of diethylene glycol and 0.1 kg of a surfactant were sprayed in the upwind zone under a relatively small cumulus cloud at a distance to the basis of the cloud of about 50 m. The nozzles' diameter and the spraying pressure were chosen such that mainly small drops of a diameter of 20 to 80 μ were formed. The surfactant used was prepared by oxethylating 1 mol of oleyl alcohol with 200 mols of ethylene oxide. The basis of the cloud was at a height of about 1,500 m; in the zone of treatment a temperature of + 9°C was measured. The upwind component was evaluated to be about 2.5 m/sec.

After 2 minutes after having terminated the spraying process well visible perforations appeared in the cloud basis from where on the cloud was completely dispelled within a period of about 15 minutes in total.

EXAMPLE 26

By means of the spraying aeroplane described in Example 24, a solution of 4 kg of sorbitol in 16 kg of ethylene glycol was sprayed over a relatively small cumulus cloud in the state of development ("swelling") the aeroplane flying over the cloud at a distance of about 50 m (in height). The treatment was carried out at 2,100 m at a temperature of + 2°C. The nozzle perforations and the spraying pressure were chosen such that mainly small drops of a diameter of 200 to 400 μ were formed. About 2 minutes after spraying had begun the "swellings" of the cloud stopped and the cumulus tower gradually collapsed while forming several pieces. After 18 minutes in total the cloud had completely been dissolved.

EXAMPLE 27

15 Parts of fructose were dissolved in a mixture of 60 parts of ethylene glycol and 25 parts of propandiol-(1.2). 30 kg of the solution so obtained were atomized by means of the aeroplane described in Example 24 at a height distance of about 50 m over a high fog screen about 100 m thick lying at a height of 600 – 700 m. The agent mixture was introduced by spraying in a circular line. The nozzles' diameter and the spraying pressure were chosen in such a manner that mainly small drops of a diameter of 200 to 400 μ were formed. The temperature in the zone of treatment was + 10°C. About 4 minutes after the spraying process has been terminated it could be seen from the ground that the high fog cover cleared up and after a further 3 minutes the blue sky appeared at some places. After 18 minutes in total a hole of irregular outlines of a diameter of about 300 m had been formed in the fog cover.

EXAMPLE 28

20 parts of anhydrous disodium phosphate, 78 parts of propandiol-(1,2), 1.9 parts of polyethylene glycol of a molar weight of about 2,000 and 0.1 part of N,N-dimethyl-N-dodecyl-N-benzylammonium-chloride were ground on a stirrer ball mill (bead mill) with quarzite beads of a 2 mm diameter so long until a stable dispersion of a 2 – 4 μ particle size was obtained. The dispersion of agent so obtained was sprayed from the aeroplane described in Example 24 at a distance of about 50 m over a fog screen lying upon the ground in a valley the amount of agent used being about 10 mg/m$^3$. The nozzles' diameter and the spraying pressure were adjusted in such a manner that mainly particles of a 100 – 300 μ diameter were formed. The visual range in the fog stated by means of marked sticks at the valley bottom was about 25 m and the temperature measured mounted to + 2°C. About 7 minutes after having sprayed the agent mixture the visibility was improved and after a further 10 minutes the marks became visible at 80 m. After 16 minutes the visibility range was improved to a maximum of about 200 m. Thereafter, the fog grew denser and after about m. minutes the sight distance was again only 20 – 50 m.

EXAMPLE 29

A special aeroplane (of the type of Grumman Ag-Cat) was provided with 6 rotary spraying heads of the type of "Beecomist" each time three of which were mounted at each side of the lower wing. These hands consist on principle of a rotary perforated cylinder which can be adjusted continuously to 7,000 – 12,000 rpm by a direct current motor fed by the mains power supply. The liquid to be sprayed which flows pressureless into the cylinder leaves the perforations of the cylinder jacket by centrifugal power and is thrown tangentially, the thin liquid stream being split into small drops of almost the same size.

Due to this working principle a relatively narrowly limited drop size distribution is obtained the medium drop size depending on the size of the cylinder perforations and on the circumferential speed of the cylinder jacket, the spraying liquid remaining the same.

By means of this spraying aeroplane 30 kg of a solution of 20 parts of anhydrous dipotassiumhydrogen phosphate in 80 parts of ethylene glycol were sprayed at a distance of about 50 m over a cloud of the stratocumulus type. The nozzle parameters were adjusted in such a manner that mainly small drops of a medium diameter of 80 $\mu$ were formed. The basis of the cloud was at about 1,500 m height and the cloud cover reached down to about 50 m. The temperature in the space of treatment was + 8°C. After a latent period of about 7 minutes the cloud showed symptoms of dissolution. It was observed from an aeroplane turning over the cloud that the cloud showed a flocky disintegration at the places sprayed which ended up in dissolution after about 20 minutes. The unsprayed parts of the stratocumulus system did not show any appreciable changes.

EXAMPLE 30

The agent used was a technical grade polyethylene glycol having a medium molecular weight of about 200 and it was constituted (as shown by the analysis of gas chromatography) of 0.1 percent of ethylene glycol, 3.4 percent of diethylene glycol, 21.2 percent of triethylene glycol, 31.2 percent of triethylene glycol, 24.4 percent of pentaethylene glycol, 14.0 percent of hexaethylene glycol, 5.4 percent of heptaethylene glycol and 0.3 percent of octaethylene glycol. 30 kg of this agent mixture were sprayed from an aeroplane as described in Example 29 over a length of 1.5 km on a high fog screen lying in a valley. The nozzle parameters were adjusted in such a manner that mainly small drops of a medium diameter of 80 $\mu$ were formed. The aeroplane was flying about 50 m over the upper limit of the fog and spraying was effected covering about 100 m in breadth. About 4 minutes after spraying had been terminated the fog screen began to break up and after a further 8 minutes there was ground visibility at the places sprayed.

EXAMPLE 31

20 Parts of urea were dissolved in 80 parts of propandiol-(1,2). 60 kg of the agent mixture so obtained were introduced from the aeroplane described in Example 29 into a fog lying in a valley which had risen by temperature inversion and which vertically reached up to about 80 m. The visual range in this fog was, as evaluated by marked sticks at the valley bottoms, about 30 m, the temperature was + 2°C. The agent mixture was sprayed from a height of about 50 m over the upper limit of the fog in carpet-like manner by overflying it, 5 times, the nozzle parameters having been adjusted in such a manner that mainly small drops of a medium diameter of 90 $\mu$ were formed. About 5 minutes after having terminated the spraying process it could be observed from the aeroplane that net-like structures appeared in the upper fog limit which disintegrated to individual rags making expanded ground visibility possible. Likewise, it could be observed at the valley bottom that the fog coagulated thus giving a fluctuating improvement of the visibility. After about 20 minutes in total fog rags were to be found mainly at the edges of the valley which did not hinder the visibility.

EXAMPLE 32

Twenty-five kg of a solution consisting of 15 parts of anhydrous calcium chloride in 85 parts of ethylene glycol were sprayed from an aeroplane in the upwind zone of a relatively small cumulus cloud. The aeroplane (of the type of Dornier Do 27) was provided for this purposs with 6 binary nozzles mounted under the wings. In the fuselage of the aeroplane there was a reserve vessel for the agent mixture and a compressed air bottle provided with reduction valve. The nozzle heads had an elliptical perforation (flat jet nozzles) which was dimensioned in such a manner that with correspondingly admixing air mainly small drops of a medium diameter of 20 – 50 $\mu$ were formed. The cloud basis was at a height of 1400 m; in the zone of treatment which was about 50 m below the cloud, a temperature of + 8°C and an upwind speed component of about 2 m/sec. were measured. About 3 minutes after having terminated the spraying process irregular, net-like structures appeared in the basis of the cloud which led to complete dissolution of the cloud within a period of about 20 minutes in total. Comparable cumulus clouds next to it did not show any tendency to dissolve.

EXAMPLE 33

Fifteen parts of anhydrous dextrose were dissolved in a mixture of 60 parts of ethylene glycol and 25 parts of triethylene glycol. 40 kg of this mixture were sprayed from the aeroplane described in Example 29 over a ground fog screen about 30 m thick which was lying on a marshy river valley. The aeroplane overflew it about 2 km in length while spraying at a distance of about 50 m above the upper limit of the fog. The nozzle parameters were adjusted in such a manner that mainly small drops of a medium diameter of 90 $\mu$ were formed. About 6 minutes after spraying had been terminated it could be observed from the aeroplane that the fog was dispelled. After a further 4 minutes ground visibility was stated at the places sprayed and after about 15 minutes in total a ditch about 100 m broad expanding down to the ground had formed in the fog bank.

EXAMPLE 34

25 kg of a mixture of 50 parts of butandiol-(1,4), 49.8 parts of diethylene glycol and 0.2 part of a surfactant which had been prepared by addition reaction of 300 mols of ethylene oxide and 1 mol of p-nonylphenol were sprayed under conditions as described in Example 32 in the upwind zone under a small cumulus cloud. The basis of the cloud was at a height of 1,200 m; in the zone of treatment there was measured an upwind speed component of 2.8 m/sec. and a temperature of + 12°C.

The nozzle parameters of the binary flat-jet nozzles were adjusted in such a manner that mainly small drops of a diameter of 40 – 80 $\mu$ were formed. About 4 minutes after spraying had been finished irregularities were stated in the basis of the cloud. The cumulus tower collapsed and the cloud broke into several parts which were completely dispelled in a period of 20 minutes in total.

EXAMPLE 35

Forty kg of glycerol of 85 percent strength were sprayed from the aeroplane described in Example 32 in the lower third of a still swelling cumulus cloud. The nozzle parameters of the binary flat-jet nozzles were adjusted in such a manner that mainly small drops of a 50 to 100 μ diameter were formed. The fly height was 1500 m and the temperature in the cloud measured + 14°C. About 7 minutes after spraying had been finished the cumulus tower collapsed and the cloud was divided into two parts of different size the smaller of which was dispelled in the course of about 15 minutes in total. The larger part was highly reduced but did not dissolve completely. It redevelopped after its reduction to a minimum 20 minutes after the end of spraying to a cumulus cloud which was, however, somewhat smaller.

EXAMPLE 36

Twenty-five kg of a solution of 40 parts of 2,2-dimethyl-propandiol-(1,3) in 60 parts of propandiol-(1,2) were sprayed under the conditions described in Example 32 under a small cumulus cloud. The nozzle parameters of the flat-jet nozzles used were adjusted in such a manner that small drops of a medium diameter of about 40 – 80 μ were formed. The basis of the cloud was at a height of 1400 m, the temperature in the zone of treatment — about 50 m below the basis of the cloud — was + 11°C. The upwind speed component was stated to be 2.2 m/sec. 4 minutes after spraying had been terminated the basis of the cloud showed clear perforations which perceptibly increased and led to the disintegration of the cloud to several parts. The smaller clouds so formed were completely dispelled in the course of about 25 minutes in total.

EXAMPLE 37

Twenty-five kg of butandiol-(1,3) were sprayed under conditions similar to those described in Example 32, under a relatively small cumulus cloud. The spraying conditions were determined in such a manner that mainly small drops of a 50 – 100 μ diameter were formed. The basis of the cloud was at a height of 1500, the temperature in the zone of treatment - about 50 m below the cloud basis — was + 7°C and the upwind speed component was 3 m/sec. About 5 minutes after having terminated the spraying process the cumulus tower, in heavy upwards movement before, now collapsed and the cloud broke into several relatively small parts which were dispelled in the course of about 20 minutes in total.

We claim:

1. A process for dispelling fog and clouds, which comprises contacting fog and clouds with an effective amount of a solid compound of the formula $$Z(OH)_n \qquad \text{I,}$$

wherein Z is an organic straight chained, branched or cyclic radical and $n$ is a number of at least 2 with the proviso, that at least 2 of the OH groups are alcoholic hydroxy groups.

2. A process as defined in claim 1, wherein the radical Z consists of one to eight units of three to six carbon atoms each.

3. A process as defined in claim 2, wherein Z consists of one to two units of four to six carbon atoms each.

4. A process as defined in claim 2, wherein Z consists of one to two units with five to six carbon atoms each and the said units consist of carbon-, hydrogen - and oxygen atoms only.

5. A process as defined in claim 1, wherein the said compound of the formula I is a polyvinylalcohol of a molecular weight of about 3,500 to about 2 000 000.

6. A process as defined in claim 5, wherein the said polyvinylalcohol is partially acetylated.

7. A process as defined in claim 2, wherein the said solid compound is saccharose, dextrose, fructose, sorbitol, mannitol, pentaerithritol, dextrin, or a mixture thereof.

8. A process as defined in claim 2, wherein fog or clouds are contacted with a compound of the formula I having a particle size of about 1 to about 100 μ.

9. A process as defined in claim 8, wherein the said compound as a particle size of about 10 to about 50 μ.

10. A process as defined in claim 1, wherein a compound of the formula I is applied to fog and clouds together with urea, disodium-, dipotassium, hydrogenphosphate or calcium chloride.

11. A process as defined in claim 1, wherein the said compound of the formula I is water soluable.

* * * * *